US009111570B1

(12) United States Patent
Freitag et al.

(10) Patent No.: US 9,111,570 B1
(45) Date of Patent: Aug. 18, 2015

(54) REPLICATION OF TAPE CARTRIDGE DATA

(71) Applicant: International Business Machines Corporation, Armonk, NY (US)

(72) Inventors: Bernd Freitag, Partenheim (DE); Frank Krick, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/489,697

(22) Filed: Sep. 18, 2014

(51) Int. Cl.
| | |
|---|---|
| *G11B 5/86* | (2006.01) |
| *G11B 27/024* | (2006.01) |
| *G11B 15/68* | (2006.01) |
| *G11B 27/032* | (2006.01) |
| *G11B 20/12* | (2006.01) |
| *G11B 27/00* | (2006.01) |

(52) U.S. Cl.
CPC ............... *G11B 27/024* (2013.01); *G11B 5/86* (2013.01); *G11B 15/6835* (2013.01); *G11B 20/1201* (2013.01); *G11B 27/032* (2013.01); *G11B 15/689* (2013.01); *G11B 27/002* (2013.01); *G11B 2220/90* (2013.01)

(58) Field of Classification Search
CPC ........... G11B 2220/90; G11B 15/6835; G11B 20/1803; G11B 20/1201; G11B 27/032; G11B 27/36; G11B 27/002; G11B 15/689; G11B 17/225
USPC ........... 360/60, 31, 48, 15, 53, 91, 72.1, 92.1, 360/49, 71, 72.3, 78.04, 39, 55; 711/111, 711/112, 158, 162
See application file for complete search history.

(56) References Cited

U.S. PATENT DOCUMENTS

| | | | |
|---|---|---|---|
| 7,848,183 B2 | 12/2010 | Sasaki | |
| 8,019,908 B2 | 9/2011 | Georgis | |
| 8,122,191 B2 | 2/2012 | Desimone et al. | |
| 8,332,686 B2 | 12/2012 | Thompson et al. | |
| 8,553,344 B2 * | 10/2013 | Thompson et al. | 360/15 |
| 8,589,648 B2 | 11/2013 | Coney et al. | |
| 8,675,296 B2 * | 3/2014 | Amir et al. | 360/15 |
| 2013/0271865 A1 | 10/2013 | Amir et al. | |

OTHER PUBLICATIONS

"Data Replication Using Tape", Copyright 1994-2013 NetApp, Inc., Part No. 215-07982-AD, May 2013, <https://library.netapp.com/ecmdocs/ECMP1196991/html/GUID-46E73E66-F6EA-465C-A722-C7A186C7C39C.html>.
"Autoloaders, Tape Library Replication Solutions", Unylogix Technologies, inc., Copyright 2002 Unylogix Technologies Inc., <http://www.unylogix.com/data_storage/tape_replication/library_replication.html>.

* cited by examiner

*Primary Examiner* — Ali Neyzari
(74) *Attorney, Agent, or Firm* — Noah A. Sharkan

(57) ABSTRACT

Embodiments of the present invention disclose methods, computer program products, and systems for replicating data stored on a tape cartridge on one or more computing devices. In one embodiment, when priming a first tape cartridge for writing of data, the first tape cartridge is configured for replication to a second tape cartridge. Subsequently, after loading the first tape cartridge into a first tape drive, data stored on the first tape cartridge can be directly transmitted from the first tape drive to a second tape drive in which the second tape cartridge is loaded without using an intermediate host computer system to facilitate data transfer.

20 Claims, 4 Drawing Sheets

REPLICATION OF TAPE CARTRIDGE DATA

BACKGROUND OF THE INVENTION

The present invention relates generally to data replication, and more particularly to replication of magnetic tape cartridges.

Magnetic tape data storage systems store digital information on magnetic tape, which is typically packaged in cartridges and cassettes. A tape drive is used to write and read data. Autoloaders and tape libraries allow for automated cartridge handling.

In the context of magnetic tape, the term cassette usually refers to an enclosure that holds two reels with a single span of magnetic tape. The term cartridge is more generic but frequently means a single reel of tape in a plastic enclosure.

A tape drive (i.e., transport or deck) uses precisely controlled motors to wind the tape from one reel to the other, passing a read/write head as it does. A different type of tape cartridge has a continuous loop of tape wound on a special reel that allows tape to be withdrawn from the center of the reel and then wrapped up around the edge. This type is similar to a cassette in that there is no take-up reel inside the tape drive.

SUMMARY

Embodiments of the present invention disclose methods, computer program products, and systems for replicating data stored on a tape cartridge on one or more computing devices. In one embodiment, one or more computer processors identify a first tape cartridge to be replicated, wherein the first tape cartridge is loaded into the first tape drive. Data stored on the first tape cartridge is identified for replication to a second tape cartridge, wherein the second tape cartridge is loaded into a second tape drive. The identified data is transmitted from an initiator port of the first tape drive to a target port of the second tape drive.

DETAILED DESCRIPTION

In current backup environments, tape storage is typically used as a long term and cost efficient data storage. Companies may require their data to be stored at multiple locations and often in different countries as part of their disaster recovery strategy. In the event data storage is compromised, the host applications may automatically switch to alternative storage locations. Disk storage and virtualized storage systems (e.g., virtual tape libraries) are typically employed to enable data replication or mirroring to automatically transfer the data to another system.

Embodiments of the present invention provide systems and methods for replicating data from one tape cartridge to another tape cartridge without the need for an intermediate host. Eliminating the need for a host during replication can help avoid data transfer bottle necks when network traffic is high. Furthermore, embodiments of the present invention provide increased flexibility as to the amount of data that is replicated, which can help eliminate wasted time and resources that might otherwise be spent replicating all data on a tape cartridge.

Implementation of embodiments of the invention may take a variety of forms, and exemplary implementation details are discussed subsequently with reference to the Figures.

Figure 1:
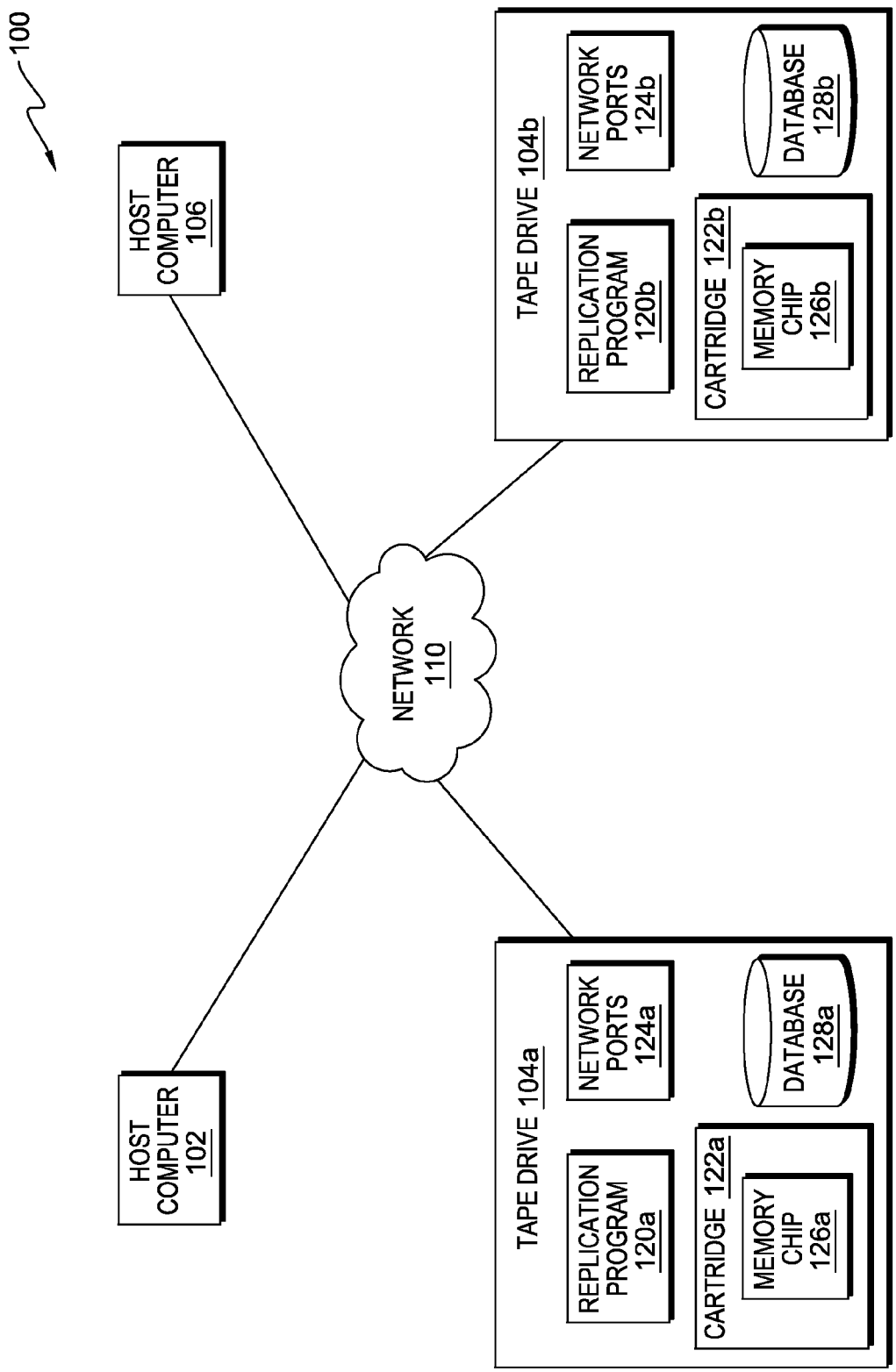
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes host computer 102, host computer 106, tape drive 104a and tape drive 104b, all interconnected over network 110. Network 110 can be, for example, a telecommunications network, a local area network (LAN), a wide area network (WAN), such as the Internet, or a combination of the three, and can include wired, wireless, or fiber optic connections. Network 110 may include one or more wired and/or wireless networks that are capable of receiving and transmitting data, voice, and/or video signals, including multimedia signals that include voice, data, and video information.

Host computers 102 and 106 may be management servers, web servers, or any other electronic devices or computing systems capable of receiving and sending data. In other embodiments, host computer 102 and 106 may represent server computing systems utilizing multiple computers as a server system, such as in a cloud computing environment. In another embodiment, host computer 102 and 106 may be laptop computers, tablet computers, netbook computers, personal computers (PC), desktop computers, personal digital assistants (PDA), smart phones, or any programmable electronic devices capable of communicating with tape drive 104a and tape drive 104b via network 110. In another embodiment, host computer 102 represents a computing system utilizing clustered computers and components to act as a single pool of seamless resources. In certain embodiments, client computers 102 and 106 represent computer systems utilizing clustered computers and components to act as a single pool of seamless resources when accessed through network 110. For example, such embodiments may be used in datacenter, cloud computing, storage area network (SAN), and network attached storage (NAS) applications.

Tape drive 104a and tape drive 104b are data storage devices that can read and write data on a magnetic tape. In some embodiments, magnetic tape is stored in removable cartridges. A magnetic tape drive may contain a pin power connector, an interface that allows a connection to a magnetic tape library, and two separate connections with separate addresses to the network. A tape drive also contains a receptacle for magnetic tape or a cartridge (e.g., cartridge 122a) containing magnetic tape on which it can write data. In some embodiments, tape drives 104a and 104b may be part of a library in which an automated system can eject or insert new cartridges. Tape drives 104a and 104b are capable of communicating with host computers 102 and 106 via network 110. In the depicted environment, tape drives 104a and 104b contain respective replication programs 120a and 120b, cartridges 122a and 122b, network ports 124a and 124b, and databases 128a and 128b.

In this exemplary embodiment, replication programs 120a and 120b can program respective memory chips 126a and 126b, located in respective cartridges 122a and 122b, and enable data replication from cartridge 122a to cartridge 122b over network 110 and vice-versa. In the depicted distributed data processing environment 100, replication program 120a and replication program 120b reside on tape drive 104a and tape drive 104b, respectively. In another embodiment, replication program 120a and/or replication program 120b may be located on respective host computers 102 and 106. In yet another embodiment, replication programs 120a and 120b may be located in a tape library (not depicted) that is connected to tape drives 104a and 104b via network 110. Replication programs 120a and 120b are depicted and described in further detail with respect to FIG. 2 and FIG. 3.

Cartridges 122a and 122b are devices that house magnetic tape used to store data. In various embodiments, cartridges 122a and 122b may contain one reel of magnetic tape in a plastic enclosure, two reels of magnetic tape, or any other variation know in the art. Cartridges 122a and 122b can be inserted into respective tape drives 104a and 104b manually or automatically (e.g., by a robot in an automated tape library) after which data may be written onto the magnetic tape within the cartridge or read from the magnetic tape within the cartridge. Cartridges 122a and 122b contain memory chips 126a and 126b, respectively. In this exemplary embodiment, cartridges 122a and 122b are implemented with linear tape-open (LTO) cartridges. In general, any suitable type of tape cartridge may be used.

Memory chips 126a and 126b are used to store information identifying cartridges 122a and 122b and tape-use information. For example, where cartridges 122a and 122b are linear tape-open (LTO) cartridges, memory chips 126a and 126b may contain one or more tables containing the addresses and byte ranges for various data, such as file names, cartridge barcodes, tape directory pages, application specific pages, and unused memory locations for data located on cartridges 122a or 122b, respectively. In this embodiment, memory chips 126a and 126b are radio frequency identification (RFID) chips that communicate with tape drives 104a and 104b, respectively.

Network ports 124a and 124b allow for the transfer of data from tape drives 104a and 104b to host computers 102 and 106 via network 110. Network ports 124a and 124b can also be switched from target mode to initiator mode to activate a direct communication between tape drives 104a and 104b via network 110. In various embodiments, network ports 124a and 124b each comprise two or more ports for data transfer to and from tape drives 104a and 104b, respectively. For example, network ports 124a and 124b can each comprise two or more small computer system interface (SCSI)/Fibre Channel ports, two or more transmission control protocol (TCP)/internet protocol (IP) network ports, and/or a combination of a SCSI/Fibre Channel port and a TCP/IP port. Where network ports 124a and 124b each comprise two or more SCSI/Fibre Channel ports, one port may remain configured as a target port (i.e., to receive commands from host computer 102 and/or host computer 106), while another port may be configured as an initiator port (i.e., to send commands to tape drive 104a or tape drive 104b). When using a single SCSI/Fibre Channel port and one or more TCP/IP ports, the SCSI/Fibre Channel port may remain configured as a target port, while a TCP/IP port may be configured as an initiator port.

In this embodiment, databases 128a and 128b contain barcodes and/or other descriptive markers of previous cartridges to which tape drives 104a and 104b have written data and/or read. Databases 128a and 128b can each be implemented with any type of storage device and architecture capable of storing data that may be accessed and utilized by tape drives 104a and 104b, such as a database server, a hard disk drive, or a flash memory having a relational database, object-oriented database, or table. In other embodiments, databases 128a and 128b can each represent multiple storage devices within tape drives 104a and 104b, respectively.

It should be understood that, for illustrative purposes, FIG. 1 does not show other computer systems and elements which may be present when implementing embodiments of the present invention. For example, while FIG. 1 shows two host computers 102 and 106b and two tape drives 104a and 104b, distributed data processing environment 100 can also include additional host computers and/or additional tape drives amongst which data is replicated.

Figure 2:
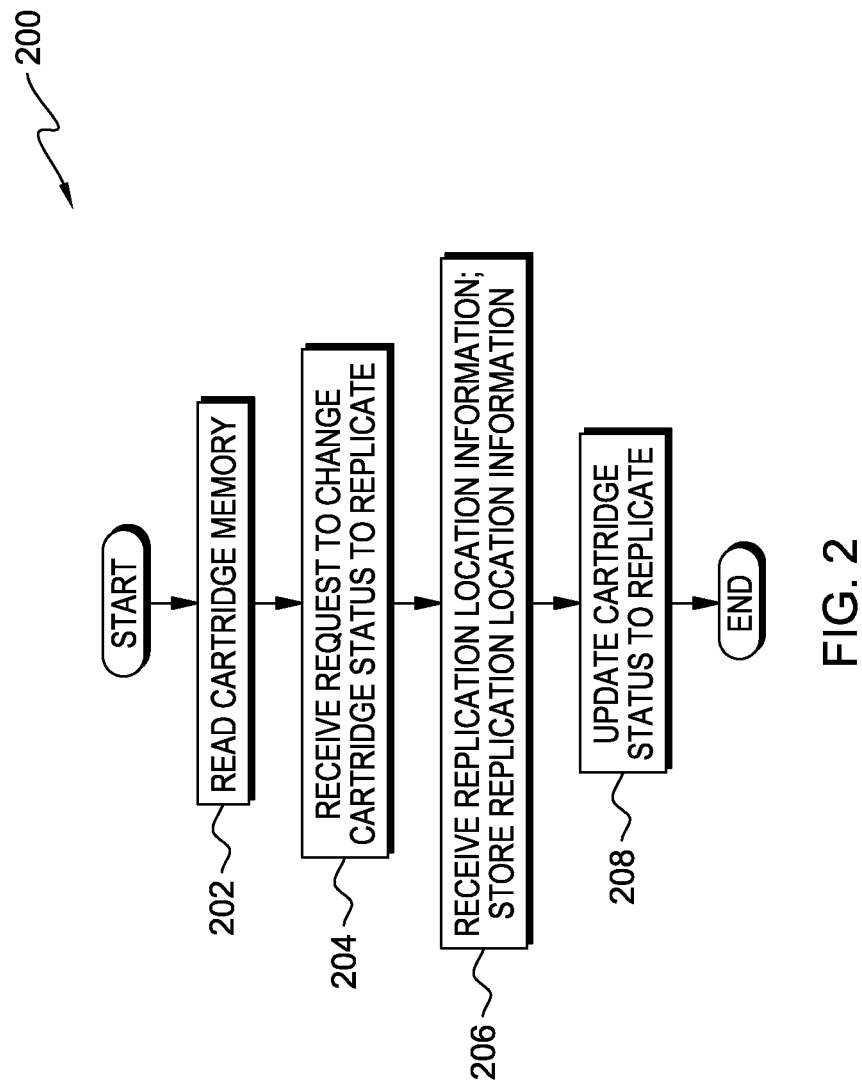
FIG. 2 is a flowchart depicting operational steps for priming a cartridge for replication of data from one tape drive to another tape drive within the distributed data processing environment of FIG. 1, in accordance with an embodiment of the present invention.

FIG. 2 is a flowchart depicting operational steps for priming a cartridge for replication of data from one tape drive to another tape drive, in accordance with an embodiment of the present invention. For illustrative purposes, FIG. 2 will be discussed with regard to replication program 120a priming cartridge 122a for replication of data from tape drive 104a to tape drive 104b; however, it should be understood that the operational steps of FIG. 2 may also be performed by replication program 120b for replication of data from tape drive 104b to tape drive 104a, and/or between any other tape drives within distributed data processing environment 100.

In one embodiment, replication program 120a initiates upon the insertion of cartridge 122a into tape drive 104a. In another embodiment, replication program 120a initiates upon the manual prompt of a user of host computer 102. In yet another embodiment, replication program 120a initiates upon a request by a backup program located on host computer 102. In yet another embodiment, replication program 120a begins at a predetermined time stored in database 128a located on tape drive 104a.

In step 202, replication program 120a reads memory chip 126a to access information pertaining to data that has been stored on cartridge 122a, which allows tape drive 104a to write data in the correct locations. In this embodiment, replication program 120a stores the obtained information in database 128a. Examples of such information located on memory chip 126a may include a list of file names, the size of each file, the address of each file on cartridge 122a (e.g., beginning at byte 100 and ending at byte 200 on cartridge 122a), locations of unused space, the barcode of cartridge 122a, the name of cartridge 122a, or any other descriptive criteria for cartridge 122a known in the art. In another embodiment, a host computer, such as host computer 102, may read memory chip 126a.

In step 204, replication program 120a receives a request to change the cartridge status to replicate. In this embodiment, replication program 120a receives a request from host computer 102 to change the status of cartridge 122a to replicate. For example, when host computer 102 sends data to tape drive 104a to be written on cartridge 122a, the data to be written on cartridge 122a can also include a request to change the cartridge status to replicate. In another embodiment, host computer 102 can have a preset schedule according to which host computer 102 sends the request for replication program 120a to set cartridge 122a to be replicated. In yet another embodiment, a user of host computer 102 may initiate sending of a request to replication program 120a to set cartridge 122a to replicate. In yet another embodiment, a backup program located on host computer 102 may initiate sending a request to replication program 120a to set cartridge 122a to replicate.

In step 206, replication program 120a receives replication location information and stores the replication location information on memory chip 126a. In this embodiment, replication program 120a receives replication location information for tape drive 104b and cartridge 122b from host computer 102. In another embodiment, cartridge 122a can receive replication location information for tape drive 104b and cartridge 122b via an external RFID chip reader.

In step 208, replication program 120a updates the cartridge status of cartridge 122a to replicate. In this embodiment, replication program 120a updates the cartridge status of cartridge 122a to replicate by setting a specified replication bit in memory chip 126a to a "1" value instead of a "0" value. In this embodiment, replication program 120a updates the cartridge status of cartridge 122a in response to receiving the request from host computer 102 to set cartridge 122a to replicate. In another embodiment, replication program 120a can be configured to set all new cartridges (e.g., cartridges that have no data previously stored on them) to be replicated by default, such as upon inserting a new cartridge into tape drive 104a or upon first writing data to a new cartridge. In addition to setting cartridge 122a to be replicated, replication program 120a can also set a time and/or schedule for the replication to take place. For example, replication program 120a can set cartridge 122a to replicate and include the time of day for the replication to take place, such as 1:00 am, or include a schedule for replication to take place every two weeks at 2:00 pm. In another embodiment, replication program 120a can be configured to initiate replication upon setting cartridge 122a to replicate.

Figure 3:
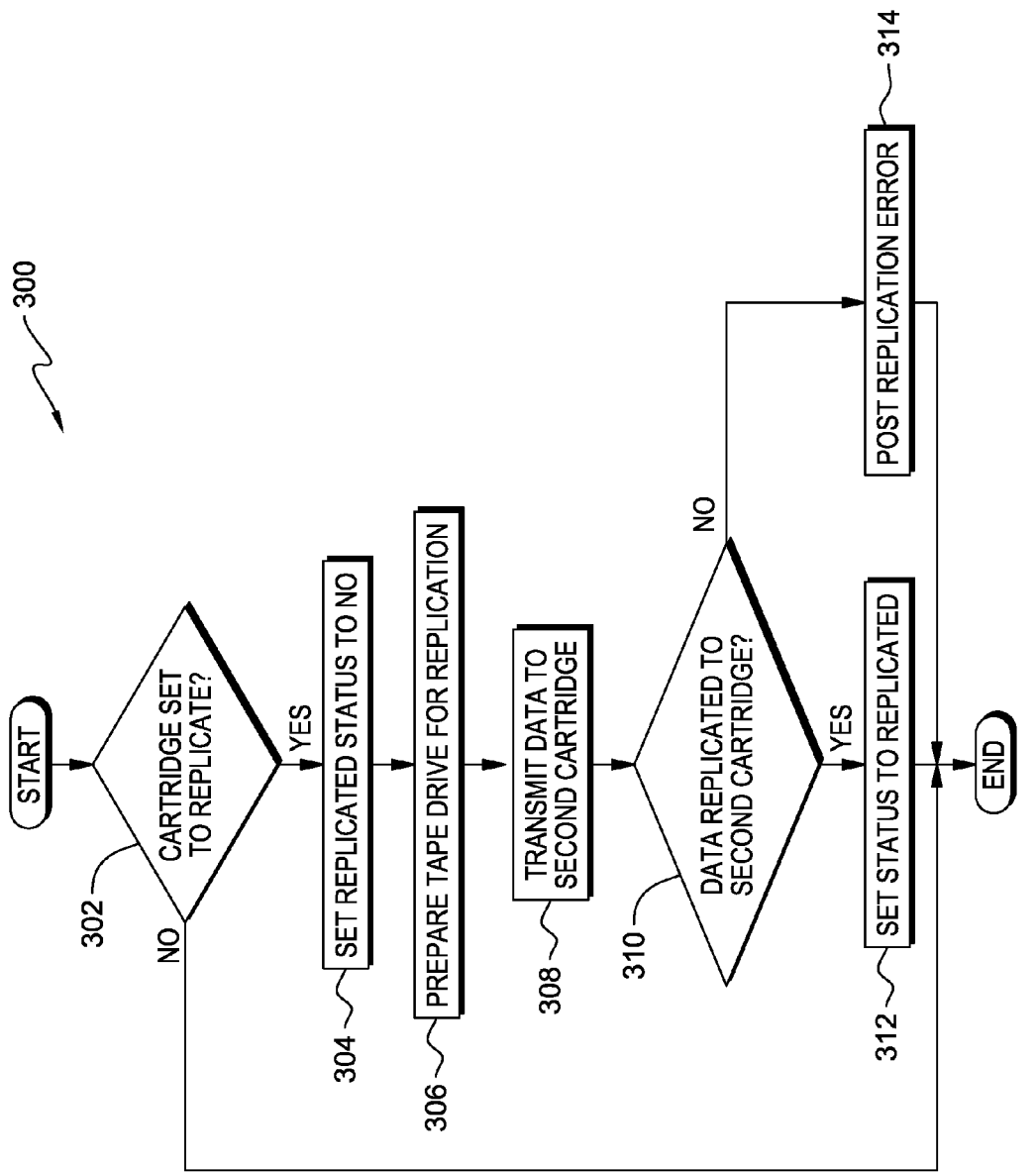
FIG. 3 is a flowchart depicting operational steps for replicating data from one tape drive to another tape drive, on a tape drive within the distributed data processing environment of FIG. 1, in accordance with an embodiment of the present invention.

FIG. 3 is a flowchart depicting operational steps for replicating data from one tape drive to another tape drive, in accordance with an embodiment of the present invention. Again, for illustrative purposes, FIG. 3 will be discussed with regard to replication program 120a operating on tape drive 104a to replicate data from cartridge 122a to cartridge 122b in tape drive 104b; however, it should be understood that the operational steps of FIG. 3 may also be performed by replication program 120b for replication of data from tape drive 104b to tape drive 104a and/or between any other tape drives within distributed data processing environment 100.

In one embodiment, the operational steps of FIG. 3 may be initiated by a user or backup program on host computer 102. In another embodiment, replication program 120a may have a preset time at which it initiates the replication. In yet another embodiment, replication program 120a may initiate replication of cartridge 122a whenever new data is written to cartridge 122a.

In step 302, replication program 120a determines whether cartridge 122a is set to replicate. In this embodiment, replication program 120a accesses memory chip 126a to determine whether the replication bit value is set to "0" (i.e., do not replicate) or "1" (i.e., replicate). If, in step 302, replication program 120a determines that cartridge 122a is not set to replicate (i.e., the replication bit value is "0"), the operational steps of FIG. 3 end.

If, in step 302, replication program 120a determines that cartridge 122a is set to replicate (i.e., the replication bit value is "1"), then, in step 304, replication program 120a sets a replicated status of cartridge 122a to "no", if necessary. In this embodiment, the replicated status of cartridge 122a indicates whether the data on cartridge 122a has been successfully replicated using a specified replicated status bit in memory chip 126a. Accordingly, replication program 120a sets the replicated status of cartridge 122a to "no" prior to replicating data such that if in subsequent steps there is an error during the replication process, cartridge 122a will have the proper replicated status of "no". In this embodiment, where cartridge 122a contains data that has been previously replicated, replication program 120a may change the replicated status of cartridge 122a from "yes" (i.e., a replicated status bit value of "1") to "no" (i.e., a replicated status bit value of "0"); where cartridge 122a is a new cartridge, replication program 120a may set the initial replicated status of cartridge 122a to "no" (i.e., a replicated status bit value of "0"); where cartridge 122a does not contain data that has been previously replicated, and the replicated status is "no" (i.e., a replicated status bit value of "0"), replication program 120a does not need to change the replicated status of cartridge 122a.

In step 306, replication program 120a prepares tape drive 104a for replication. In this embodiment, network ports 124a comprise two SCSI/Fibre network ports. Replication program 120a changes one of the SCSI/Fibre network ports from target mode to initiator mode, which allows tape drive 104a to directly connect to tape drive 104b without an intermediate host, such as host computer 102 or host computer 106. The other SCSI/Fibre network port stays in target mode to continue receiving commands from a host system, such as host computer 102.

Replication program 120a also confirms that cartridge 122b is loaded into tape drive 104b. In this embodiment, replication program 120a queries tape drive 104b to determine the status of tape drive 104b and any loaded cartridges. If cartridge 122b is already loaded into tape drive 104b (i.e., the destination cartridge is loaded, as identified by barcode, firmware, cartridge tag, etc.), tape drive 104b need not perform any further mount operations. If cartridge 122b is not loaded into tape drive 104b, replication program 120a sends a request to tape drive 104b and/or the appropriate tape library to load and mount cartridge 122b. In another embodiment, replication program 120a may send a notification to host computer 106 to prompt a user to insert a cartridge before it will proceed with replication.

In one embodiment, cartridge 122b is selected by reading the barcode that corresponds to cartridge 122a, which is in turn associated with cartridge 122b. For example, cartridge 122a may have already written data on cartridge 122b in a previous instance, so replication program 120a can send a request to load cartridge 122b into tape drive 104b as to keep all of the corresponding data on cartridge 122b. The barcode information can be stored, for example, on database 128a and/or database 128b. Replication program 120a can also set the status of the cartridge to show that the data on the cartridge was stored by a host or that it is backup of an already existing cartridge.

In one embodiment, replication program 120a sets flags or markers on memory chip 126a to designate or define the location of newly written data, or data that has been selected for backup by a host computer, such as host computer 102. In an example, replication program 120a may set a flag for a specific file to be backed up, such as a marker on the beginning address and ending address of the file (i.e., bytes 300 through 420). In another embodiment, host computer 102 may set flags or markers on memory chip 126a during the writing of data by tape drive 104a onto cartridge 122a. In one embodiment, once flags have been set, replication program 120a proceeds to the next step.

In step 308, replication program 120a transmits data from cartridge 122a to cartridge 122b via network 110. In this embodiment, replication program 120a locates flags on memory chip 126a of cartridge 122a and sends the data located between the flags to tape drive 104b for storage on cartridge 122b. In another embodiment, replication program 120a transmits some or all data located on cartridge 122a to tape drive 104b, and replication program 120b receives the data and only writes onto cartridge 122b the data which has been flagged. In yet another embodiment, replication program 120a may transmit all data from cartridge 122a to be written onto cartridge 122b, onto numerous cartridges loaded into tape drive 104b, or onto other cartridges using non-depicted tape drives.

In an embodiment, replication program 120a displays the status of the replication. For example, replication program 120a may display the status of "in replication," or "replication completed," on host computer 102, host computer 106, tape drives 104a and 104b, and/or a tape library. The status may be displayed as a notification message to a user and/or may be logged.

In step 310, replication program 120a determines whether the transmitted data was received by tape drive 104b and successfully replicated to cartridge 122b. In this embodiment, replication program 120a queries replication program 120b to determine whether the data has been received and written onto cartridge 122b, which replication program 120b then reports to replication program 120a.

If, in step 310, replication program 120a determines that the transmitted data was not received by tape drive 104b and successfully replicated to cartridge 122b, then, in step 314, replication program 120a posts a replication error. In this embodiment, replication program 120a posts a replication error as the status, which can be displayed and/or logged on host computers 102 and 106, tape drives 104a and 104b, and/or a tape library. Unsuccessful replication of transferred data to cartridge 122b may result, for example, from interruptions in the transfer of data between tape drive 104a and tape drive 104b via network 110 (e.g., faulty connections and/or mechanical failures of cartridge 122a), and/or from errors encountered when writing data to cartridge 122b (e.g., insufficient free space on cartridge 122b, corrupted data on cartridge 122b, and/or mechanical failures of cartridge 122b). Replication errors posted by replication program 120a may include symptoms of errors as well as solutions (e.g., loading another tape cartridge).

If, in step 310, replication program 120a determines that the transmitted data was received by tape drive 104b and successfully replicated to cartridge 122b, then, in step 312, replication program 120a sets the statuses of cartridge 122a and 122b to "replicated". In this embodiment, replication program 120a sets the statuses in memory chips 126a and 126b. This allows replication program 120a to search the statuses in the future to determine whether cartridge 122a has been replicated and whether cartridge 122b contains replicated data. The statuses can also be stored in databases 128a and 128b. The statuses can be further associated with the bar codes for cartridges 122a and 122b and the addresses of the files that have been replicated.

Accordingly, by performing the operational steps of FIG. 3, data stored on a first cartridge loaded into a first tape drive can be replicated, in whole or in part, directly (i.e., without a host) onto a second cartridge loaded into a second tape drive via a network. In this embodiment, replication program 120a located on tape drive 104a may receive a prompt from a backup program located on host computer 102 to write data (e.g., a backup of application data) onto a cartridge. Replication program 120a may update the cartridge memory and status after the new data is written onto cartridge 122a. Replication program 120a may then determine whether to replicate the new information on cartridge 122a, prepare tape drive 104a and 104b for replication, and transmit the new data from cartridge 122a to cartridge 122b via network 110, without using host computer 102 or host computer 106. Finally, replication program 120a may set the status of cartridge 122a to indicate that it has been replicated, and the status of cartridge 122b to indicate that the data is replicated from another cartridge.

Figure 4:
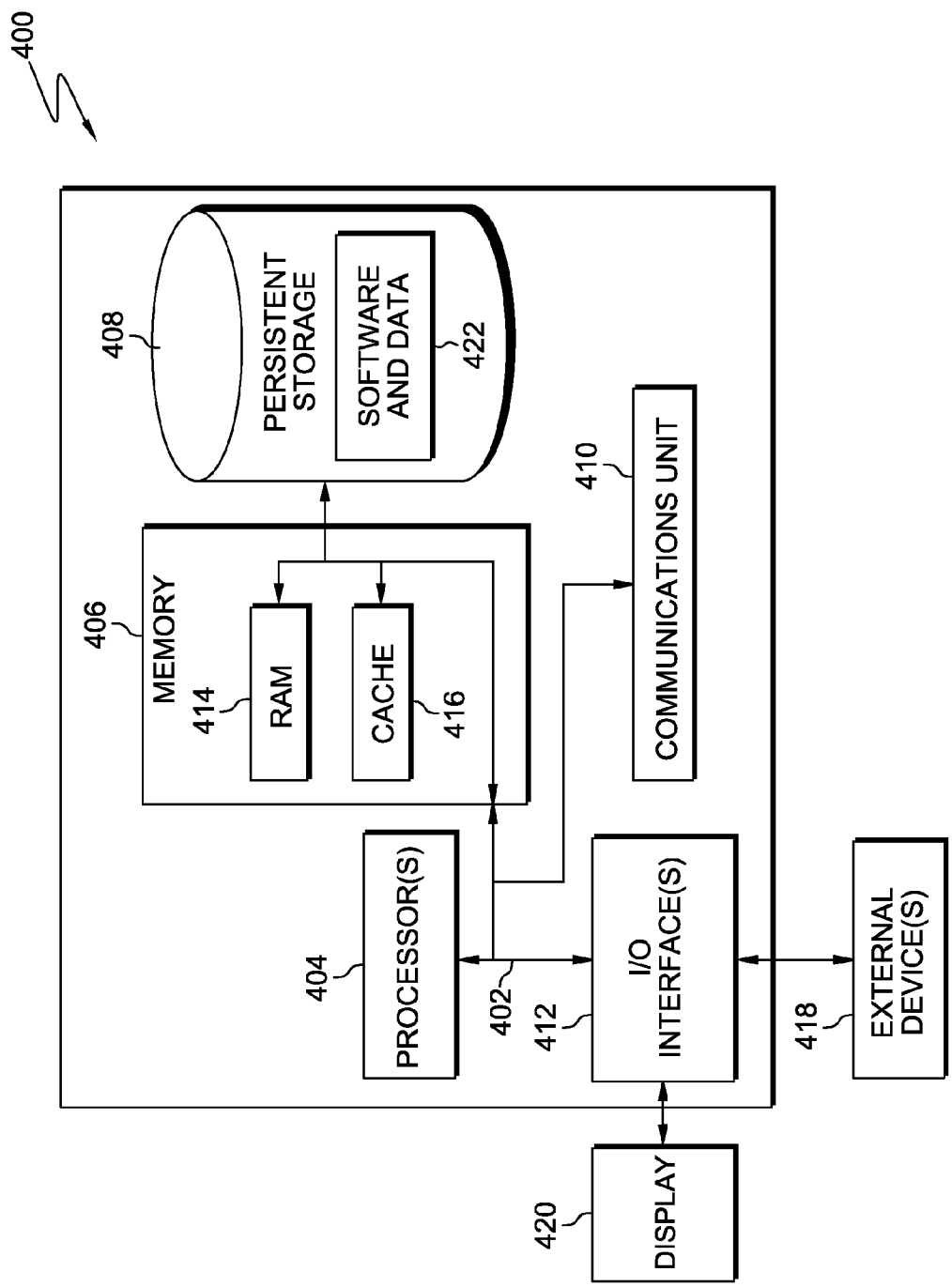
FIG. 4 depicts a block diagram of components of the computing systems of FIG. 1, in accordance with an embodiment of the present invention.

FIG. 4 depicts a block diagram of components of computer 400, which is representative of host computer 102, host computer 106, tape drive 104a, and tape drive 104b, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media. Software and data 422 are stored in persistent storage 408 for access and/or execution by processor(s) 404 via one or more memories of memory 406. With respect to tape drives 104a and 104b, software and data 422 represents replication program 120a, replication program 120b, database 128a, and database 128b, respectively.

In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data 422 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for replicating data stored on a tape cartridge, the method comprising:
   identifying, by a first tape drive, a first tape cartridge to be replicated, wherein the first tape cartridge is loaded into the first tape drive;
   identifying, by the first tape drive, data stored on the first tape cartridge to replicate to a second tape cartridge, wherein the second tape cartridge is loaded into a second tape drive; and
   transmitting, by the first tape drive, the identified data stored on the first tape cartridge from an initiator port of the first tape drive to a target port of the second tape drive.

2. The method of claim 1, further comprising:
   configuring a target port of the first tape drive to serve as the initiator port of the first tape drive.

3. The method of claim 1, further comprising:
   configuring an initiator port of the first tape drive to serve as a target port of the first tape drive after transmitting the identified data.

4. The method of claim 1, further comprising:
   setting a value of a bit in memory of the first tape cartridge to indicate whether data stored on the first tape cartridge should be replicated.

5. The method of claim 4, wherein identifying, by a first tape drive, a first tape cartridge to be replicated comprises:
   identifying, by the first tape drive, the first tape cartridge to be replicated based, at least in part, on the set value of the bit in memory of the first tape cartridge.

6. The method of claim 1, wherein identifying, by the first tape drive, data stored on the first tape cartridge to replicate to a second tape cartridge comprises:
   reading a memory within the first tape cartridge to identify a first marker and a second marker, wherein the first marker defines a beginning storage address of the data stored on the first tape cartridge to replicate to the second tape cartridge, and the second marker defines an ending storage address of the data stored on the first tape cartridge to replicate to the second tape cartridge.

7. The method of claim 1, further comprising:
   sending, by the first tape drive, a request to load the second tape cartridge into the second tape drive, wherein the second tape cartridge is selected by reading a barcode that corresponds to the first tape cartridge and is further associated with the second tape cartridge.

8. A computer program product for replicating data stored on a tape cartridge, the computer program product comprising:
   one or more computer readable storage media and program instructions stored on the one or more computer readable storage media, the program instructions comprising:
   program instructions to identify a first tape cartridge to be replicated, wherein the first tape cartridge is loaded into the first tape drive;
   program instructions to identify data stored on the first tape cartridge to replicate to a second tape cartridge, wherein the second tape cartridge is loaded into a second tape drive; and
   program instructions to transmit the identified data stored on the first tape cartridge from an initiator port of the first tape drive to a target port of the second tape drive.

9. The computer program product of claim 8, further comprising:
   program instructions to configure a target port of the first tape drive to serve as the initiator port of the first tape drive.

10. The computer program product of claim 8, further comprising:
    program instructions to configure an initiator port of the first tape drive to serve as a target port of the first tape drive after transmitting the identified data.

11. The computer program product of claim 8, further comprising:
    program instructions to set a value of a bit in memory of the first tape cartridge to indicate whether data stored on the first tape cartridge should be replicated.

12. The computer program product of claim 11, wherein the program instructions to identify a first tape cartridge to be replicated comprise:
    program instructions to identify the first tape cartridge to be replicated based, at least in part, on the set value of the bit in memory of the first tape cartridge.

13. The computer program product of claim 8, wherein the program instructions to identify data stored on the first tape cartridge to replicate to a second tape cartridge comprise:
    program instructions to read a memory within the first tape cartridge to identify a first marker and a second marker, wherein the first marker defines a beginning storage address of the data stored on the first tape cartridge to replicate to the second tape cartridge, and the second marker defines an ending storage address of the data stored on the first tape cartridge to replicate to the second tape cartridge.

14. The computer program product of claim 8, further comprising:
    program instructions to send a request to load the second tape cartridge into the second tape drive, wherein the second tape cartridge is selected by reading a barcode that corresponds to the first tape cartridge and is further associated with the second tape cartridge.

15. A computer system for replicating data stored on a tape cartridge, the computer system comprising:
    one or more computer processors;
    one or more computer readable storage media;
    program instructions stored on the computer readable storage media for execution by at least one of the one or more computer processors, the program instructions comprising:
    program instructions to identify a first tape cartridge to be replicated, wherein the first tape cartridge is loaded into the first tape drive;

program instructions to identify data stored on the first tape cartridge to replicate to a second tape cartridge, wherein the second tape cartridge is loaded into a second tape drive; and program instructions to transmit the identified data stored on the first tape cartridge from an initiator port of the first tape drive to a target port of the second tape drive.

16. The computer system of claim 15, wherein the program instructions stored on the computer readable storage media further comprise:

program instructions to configure a target port of the first tape drive to serve as the initiator port of the first tape drive.

17. The computer system of claim 15, wherein the program instructions stored on the computer readable storage media further comprise:

program instructions to configure an initiator port of the first tape drive to serve as a target port of the first tape drive after transmitting the identified data.

18. The computer system of claim 15, wherein the program instructions stored on the computer readable storage media further comprise:

program instructions to set a value of a bit in memory of the first tape cartridge to indicate whether data stored on the first tape cartridge should be replicated.

19. The computer system of claim 18, wherein the program instructions to identify a first tape cartridge to be replicated comprise:

program instruction to identify the first tape cartridge to be replicated based, at least in part, on the set value of the bit in memory of the first tape cartridge.

20. The computer system of claim 15, wherein the program instructions to identify data stored on the first tape cartridge to replicate to a second tape cartridge comprise:

program instructions to read a memory within the first tape cartridge to identify a first marker and a second marker, wherein the first marker defines a beginning storage address of the data stored on the first tape cartridge to replicate to the second tape cartridge, and the second marker defines an ending storage address of the data stored on the first tape cartridge to replicate to the second tape cartridge.

* * * * *